(12) United States Patent  
Swinburne et al.

(10) Patent No.: US 12,017,185 B2  
(45) Date of Patent: Jun. 25, 2024

(54) POLYMER MEMBRANES

(71) Applicant: Global Life Sciences Solutions Germany GmbH, Dassel (DE)

(72) Inventors: Stuart Swinburne, South Glamorgan (GB); Klaus Gebauer, Uppsala (SE)

(73) Assignee: GLOBAL LIFE SCIENCES SOLUTIONS GERMANY GMBH, Dassel (DE)

(*) Notice: Subject to any disclaimer, the term of this patent is extended or adjusted under 35 U.S.C. 154(b) by 511 days.

(21) Appl. No.: 17/286,847

(22) PCT Filed: Oct. 31, 2019

(86) PCT No.: PCT/EP2019/079895  
§ 371 (c)(1),  
(2) Date: Apr. 20, 2021

(87) PCT Pub. No.: WO2020/089421  
PCT Pub. Date: May 7, 2020

(65) Prior Publication Data  
US 2021/0346846 A1    Nov. 11, 2021

(30) Foreign Application Priority Data  
Oct. 31, 2018 (GB) ...................... 1817823

(51) Int. Cl.  
  *B01D 67/00* (2006.01)  
  *B01D 69/12* (2006.01)  
  *B01D 71/40* (2006.01)

(52) U.S. Cl.  
  CPC ....... *B01D 67/0006* (2013.01); *B01D 67/003* (2013.01); *B01D 67/0032* (2013.01);  
  (Continued)

(58) Field of Classification Search  
  USPC ............................ 210/650–655, 500.1–510.1  
  See application file for complete search history.

(56) References Cited

U.S. PATENT DOCUMENTS

| 4,923,608 | A | 5/1990 | Flottmann et al. |
| 5,449,917 | A | 9/1995 | Clements |

(Continued)

FOREIGN PATENT DOCUMENTS

| JP | 2000-262871 A | 9/2000 |
| TW | 201701978 A | 1/2017 |

(Continued)

OTHER PUBLICATIONS

Sones et al. (Lab Chip, 2014, 14, 4567. (Year: 2014).*

(Continued)

*Primary Examiner* — Clare M Perrin  
(74) *Attorney, Agent, or Firm* — Eversheds Sutherland (US) LLP

(57) ABSTRACT

Disclosed is a method for the production of a porous polymer membrane suitable for liquid filtration or analyte capture, comprising the steps of: providing a flowable composition (100) on a substrate (220) the composition including at least: photo-activatable monomer molecules, photo activation initiator molecules and photo-activation quencher molecules; providing one or more pulses (L) of laser light at at least one focal point in the composition of sufficient energy to locally polymerise the composition; moving the or each focal point relative to the previously polymerised composition in a continuous or stepwise predetermined manner to a multiplicity of further positions; and repeating the pulse(s) at those further positions such that a three dimensional matrix of the composition is polymerised leaving unpolymerized areas of a size equivalent to conventional polymer membrane pores.

13 Claims, 6 Drawing Sheets

(52) U.S. Cl.
CPC ............ B01D 69/125 (2013.01); *B01D 69/12* (2013.01); *B01D 2323/32* (2013.01); *B01D 2323/34* (2013.01); *B01D 2323/42* (2013.01); *B01D 2323/50* (2013.01); *B01D 2325/0283* (2022.08)

(56) References Cited

U.S. PATENT DOCUMENTS

| | | |
|---|---|---|
| 10,836,105 B2 | 11/2020 | Houbertz et al. |
| 2004/0084370 A1 | 5/2004 | Singh et al. |
| 2007/0131610 A1* | 6/2007 | Peng .................... C09D 163/00 428/305.5 |
| 2011/0094960 A1 | 4/2011 | Zhou et al. |
| 2013/0056910 A1 | 3/2013 | Houbertz-Krauss et al. |
| 2013/0213880 A1* | 8/2013 | Hirozawa .......... B01D 67/0088 210/500.39 |

FOREIGN PATENT DOCUMENTS

| | | | |
|---|---|---|---|
| WO | 2017/207958 A1 | 12/2017 | |
| WO | WO-2017207958 A1 * | 12/2017 | .............. B01L 3/502 |

OTHER PUBLICATIONS

PCT International Search Report and Written Opinion for PCT/EP2019/079895 dated Jan. 30, 2020 (9 pages).
Great Britain Search Report for GB Application No. 1817823.6 dated May 3, 2019 (3 pages).
Thomas et al., "Hard Templates for Soft Materials: Creating Nanostructured Organic Materials," Chem. Mater., 2008, 20(3):738-755.
Office Action Issued in Chinese Patent Application No. 201980072021.5, dated Dec. 2, 2022, with English Translation (12 Pages).
Search Report Issued in Chinese Patent Application No. 201980072021.5, dated Nov. 23, 2022, with English Translation (4 Pages).
Office Action Issued in Japanese Patent Application No. 2021-523412 with English Translation (14 Pages).

* cited by examiner

POLYMER MEMBRANES

CROSS REFERENCE TO RELATED APPLICATIONS

This application claims the priority benefit of PCT/EP2019/079895, filed on Oct. 31, 2019, which claims the benefit of Great Britain Application No. 1817823.6, filed on Oct. 31, 2018, the entire contents of which are incorporated by reference herein.

FIELD OF THE INVENTION

The present invention relates to porous polymer membranes and methods of manufacture of the same, in particular, but not exclusively for use in fluid flow-through filtering or the capturing of analytes.

BACKGROUND OF THE INVENTION

Porous membranes have many biological applications, for example: bioprocessing; biopharmaceutical processes; and cell and gene therapeutics. Constant advancements in the understanding of biological mechanisms and cellular activity mean that there is a need for more controlled membrane filtering so that retainates and filtrates that result from filtering can be better defined. Typically these retainates or filtrates are target molecules or materials, such as cells, proteins, peptides, DNA, RNA, antibodies, viruses, bacteria or phages or other microorganisms or macromolecules. Commercially available polymer membranes consist of a generally random array of pores formed by: casting a liquid web of polymer dissolved in a solvent spread across a support substrate; drying the web until the solvent evaporates; and leaving a residual solid polymer structure which has a multiplicity of pores. One manufacturing method is described in more detail in publication US20180104655A1 which is incorporated herein or otherwise relied upon, together with publications cited therein as an enabling disclosure of the general construction of a known polymer membrane.

The pore size, pore size consistency, pore shape, pore size deviation from one side of the membrane to the other, and number of pores per unit area are all very much dependent on the composition of the initial casting liquid, the thickness of the web and the web drying conditions. To some extent, to generate a membrane with a new thickness or pore size, or in a new material requires considerable trial and error, even for experienced producers of membranes. Membranes of a thickness ranging from 4 μm to 1 mm are commonly used, having pores of an average size of 0.1 to 10 μm.

Another technique to produce membrane with very small pore sizes for example 0.1 and 10 μm is by means of exposing a polymer such as polycarbonate to an electron beam pulse, analogous to a shotgun blast. The technique is known as 'track etching' and one example is described in U.S. Pat. No. 5,449,917. The result of the technique is a largely random pattern of fine pores which have inconsistent properties, even when consistent production parameters are used.

Three-dimensional (3-D) microfabrication methods are known which are based on so called two-photon polymerization of a volume of photosensitive material using ultrashort laser pulses, for making solid objects. When focused into a volume of a photosensitive material, the pulses initiate polymerization via two-photon absorption and subsequent polymerization. After laser illumination of the photosensitive material in a pattern resembling the desired 3-D form in a dimensionally controlled environment and subsequent washing away of the nonilluminated external regions, the polymerized material remains in the prescribed 3-D form. This allows fabrication of any computer-generated 3-D structure by direct laser "recording" into the volume of a photosensitive material. Under such conditions, artefacts having elements of a dimension of about 100 nm or more are possible.

3-D fabrication methods for membranes are discussed but largely dismissed in "*Perspective on 3D printing of separation membranes and comparison to related unconventional fabrication techniques. Journal of Membrane Science 2017, 523, 596-613*". However, the 3-D fabrication of fine pores in membranes is largely dismissed because the time taken to produce such pores by conventional techniques described above is said to be impracticable. For example, the above paper quotes a manufacturing time of several months for a 100 mm by 100 mm sample membrane with a pore size of 100 nm, presumably with a practically useful pore density, although a pore density is not mentioned. In addition, a practical technique for producing such membranes is not disclosed.

Conventional membranes rely on various filtration mechanisms comprising both surface filtration-fundamental a sieving action, and depth filtration, where filtration relies at least partial on physical retention of an obstructing pore structure, surface interactions of specific or non-specific type or surface modification with affinity type ligands. Known depth filtration structures may comprise multilayer membrane sandwich structures where pore size, pore structure, porosity, tortuosity and other physical pore characteristics in the layers may vary to provide asymmetric features along the path of liquid and particles passing through the membrane.

Filtering mechanisms conventional include retention of waste (clarification or flow through chromatography), retention and subsequent release of a target e.g. proteins, cells etc (also called purification) in depth filtration, or retention of a product in surface filtration (commonly called ultra- and diafiltration incl. cell washing) upstream of the filter by size exclusion.

The conventional filtration mechanisms mentioned in the above two paragraphs are part of conventional processes, and so any improved membranes need to be compatible with such mechanisms, and therefore need to have broadly equivalent physical properties.

The inventor has addressed the problems mentioned above in a novel way by taking a completely novel approach to manufacturing polymer membranes. The inventor has realised that, in one approach, low energy laser photopolymerisation of a monomer or oligomer composition can be used for producing a polymer structure, or part thereof, which has solid photopolymerised areas analogous to the polymer structure of a conventional polymer membrane, and can leave unpolymerized regions analogous to the pores left by solvent evaporation in a conventional polymer membrane, which can be removed from the remaining polymerised regions by solvent washing. In a refinement of that approach, the photopolymerised areas may each envelope unpolymerised area, such that once the unpolymerized region (pores) have been washed out, the enveloped unpolymerised regions may be wide-area photopolymerised to reduce processing time. In another approach, low energy laser photo polymerisation of the composition can be used for producing a male polymer structure which has solid polymerised areas analogous to the pores of a conventional polymer membrane, and can leave unpolymerized regions of the composition analogous to the polymer structure in a conventional polymer membrane, followed by a washing of the unpolymerized composition to leave the male regions only, and followed by casting of a further solid material at least around the male polymer structure and then removal of that male polymer structure to leave just the further solid material, now with voids left by the removed male polymer structure analogous to said pores of conventional polymer membrane. In this paragraph the term 'analogous to' means 'having the same effect as', because in practice the pores and surrounding material of a conventional polymer membrane are the result of solvent evaporation, or electron beam exposure, and so they are generally random in form, whereas photo-polymerisation can be undertaken in a dimensionally controlled way, so that there is no need, unless it is desired, to have randomness. In turn, this means that virtually any pore size(s), pore shape, pore geometry (e.g. spiral/circuitous pores), pore density, and consistency of pore sizes, can be achieved, within manufacturing tolerances. Further in turn, this means that the inadequacies of conventional polymer membranes do not have to be tolerated, because the manufacturing process described herein will allow complete control over the key geometric form of the pores produced, without the randomness of conventional membranes. For example, tortuous paths formed by evaporation of solvents during manufacture of nitrocellulose membranes can be eliminated or emulated or at will.

SUMMARY OF THE INVENTION

According to a first aspect the invention provides a method for the production of a porous polymer membrane suitable for liquid filtration or analyte capture, comprising the following steps:
providing a flowable composition on a substrate the composition including at least: photo-activatable monomer molecules, photo activation initiator molecules and photo-activation quencher molecules; providing one or more pulses of laser light at at least one focal point in the composition of sufficient energy to locally polymerise the composition; moving the or each focal point relative to the previously polymerised composition in a continuous or stepwise predetermined manner to a multiplicity of further positions and repeating the pulse(s) at those further positions such that a three dimensional matrix of the composition is polymerised leaving unpolymerized areas of a size equivalent to conventional polymer membrane pores.

In this way a polymer membrane having a predictable pore size and shape can be manufactured, and the unpredictable nature of the conventional evaporation process is largely eliminated, the only limitation being the manufacturing tolerances of the process mentioned immediately above.

In one embodiment, the composition is a solution containing photo-activatable monomer molecules, photo-activation initiator molecules, and photo-activation quencher molecules and the substrate is immersed in the solution, for example a bath of the solution, or a replenished amount of the solution.

In one embodiment the pulses of laser light are supplied by a laser via an objective lens for focusing the light to a focal point or points along a Z axis which axis is generally parallel to the direction of propagation of the laser light passing through the lens, and via further optical elements capable of moving the or each focal point along the Z axis and/or laterally to said Z axis, for example along an X axis perpendicular to said Z axis and/or in a Y axis perpendicular to the Z and X axes, wherein control of the laser and optical elements provides at least a portion of said multiplicity of positions.

In one embodiment the substrate and any polymerised composition are moved in said X, Y and/or Z axes to provide the multiplicity of positions, or a further portion of said multiplicity of positions.

Thus, the focal polymerisation position(s) of the laser light can be moved relative to the composition by optical means and/or the position of already polymerised polymer composition can be moved by mechanical means relative to the position of the laser light. Since optical movements are relatively quick and precise, but relatively restricted in dimension, one small first region of membrane, or one layer of membrane can be produced by optical repositioning of the light, before moving the new part formed region of the membrane itself mechanically and by a relatively larger distance on to a second region adjacent the first region such that the optical repositioning movements can begin again in the second region. Such a process can be repeated again and again at subsequent regions until the whole membrane is produced, formed from multiple regions of the membrane after being formed or part formed by optical repositioning of the polymerisation position. However, for small areas, solely optical repositioning of the laser light can be undertaken with good results. In order to realign the polymerised membrane with the laser focal point(s) once the membrane is moved to the second or subsequent regions, it is possible to finely position the membrane relative to laser focal point(s) by recognising a pore (or part pore) pattern using a microscope and image recognition software, and by then moving the membrane further, or adjusting the focal point position such that the pore pattern to be produced at the second or subsequent region is in register with the pore pattern produced previously. The same technique can be used to provide a datum for subsequent layers after producing layers, for example, so that asymmetric pores can be produced by deliberately stepping one layer away from an underlying layer, e.g. to form a zig-zag pore.

In one embodiment the focused laser light pulse provides low photon count coincidence, for example predominantly 2 photon absorption.

In one embodiment, the at least one focal point is a plurality of focal points, derived from a split laser beam and/or plural laser light sources. Conveniently, the focal points are in a linear array or a two dimensional array and spaced by the pitch of the desired pore spacing or a multiple of that pitch. Conveniently, the linear or two-dimensional array of focal points is moveable together optically to maintain their spacing.

In one embodiment, polymerisation is performed only at locations intended to be pore walls. The interspace between the now polymerised pore walls is left unpolymerized. In that case, the method then further includes removing the unpolymerized composition from the areas equivalent to the membrane pores, and then further wide area photopolymerising the unpolymerized interspace by means of a polymerising light applied over the whole membrane, or sequential regions thereof. Conveniently, the top and bottom of the membrane are formed also prior to said further wide area photopolymerising.

In this way, only pore walls and outer surfaces of the membrane need to be photopolymerised in dimensionally controlled conditions, in essence forming a shell, with the internal areas of the final membrane structure remaining liquid. Wide area photopolymerisation of that remaining interspace liquid composition can be effected once the unpolymerized composition of the pores has been washed out, for example by using a wide area light source such as a high energy laser or lasers. Polymerisation by heat or UV light are also possible. This technique reduces production times significantly because much of the polymerisation can be done without dimensional control.

According to a second aspect the invention provides a method for the production of a porous polymer membrane suitable for liquid filtration or analyte capture, comprising the following steps:
  providing a flowable composition on a substrate, the composition including at least: photo-activatable monomer molecules, photo activation initiator molecules and photo-activation quencher molecules;
  providing one or more pulses of laser light at at least one focal point in the composition of sufficient energy to locally polymerise the monomer;
  moving the or each focal point relative to the composition in a continuous or stepwise predetermined manner to a multiplicity of positions and repeating the pulse(s) at those positions at a such that three dimensional pillars are formed of a size equivalent to membrane pores,
  the method further comprising the steps of:
  removing unpolymerized composition, infilling the regions around said pillars with a membrane material, and then removing the pillars from the membrane material, to leave open pores in the membrane material.

The invention extends to any combination of features disclosed herein, whether or not such a combination is mentioned explicitly herein. Further, where two or more features are mentioned in combination, it is intended that such features may be claimed separately without extending the scope of the invention.

BRIEF DESCRIPTION OF THE DRAWINGS

The invention can be put into effect in numerous ways, illustrative embodiments of which are described below with reference to the drawings, wherein.

DETAILED DESCRIPTION OF THE INVENTION

Figure 1:
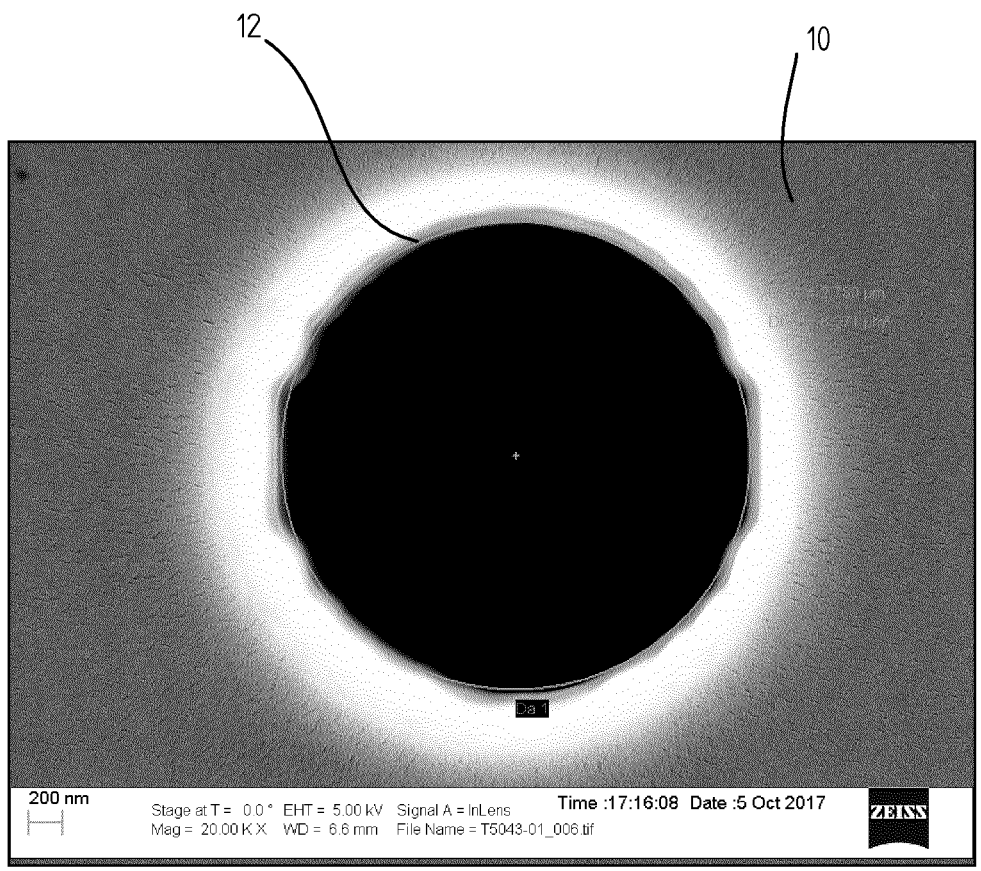
FIG. 1 shows a micrograph of a membrane according to the invention.

The invention, together with its objects and the advantages thereof, may be understood better by reference to the following description taken in conjunction with the accompanying drawings, in which like reference numerals, or reference numerals with the same last two digits, identify like elements.

Referring to FIG. 1 there is shown a micrograph of a printed polymer membrane 10 with a pore 12 in plan view, manufactured according to the protocol described below. In this example the generally circular pore 12 is shown as a black area having a diameter of about 2.5 µm, with a white 'halo' due to the effect of charge concentration on sharp edges where the dynamic range of the optical system is not wide enough to show the edge and it saturates the pixels of the micrograph.

Figure 2:
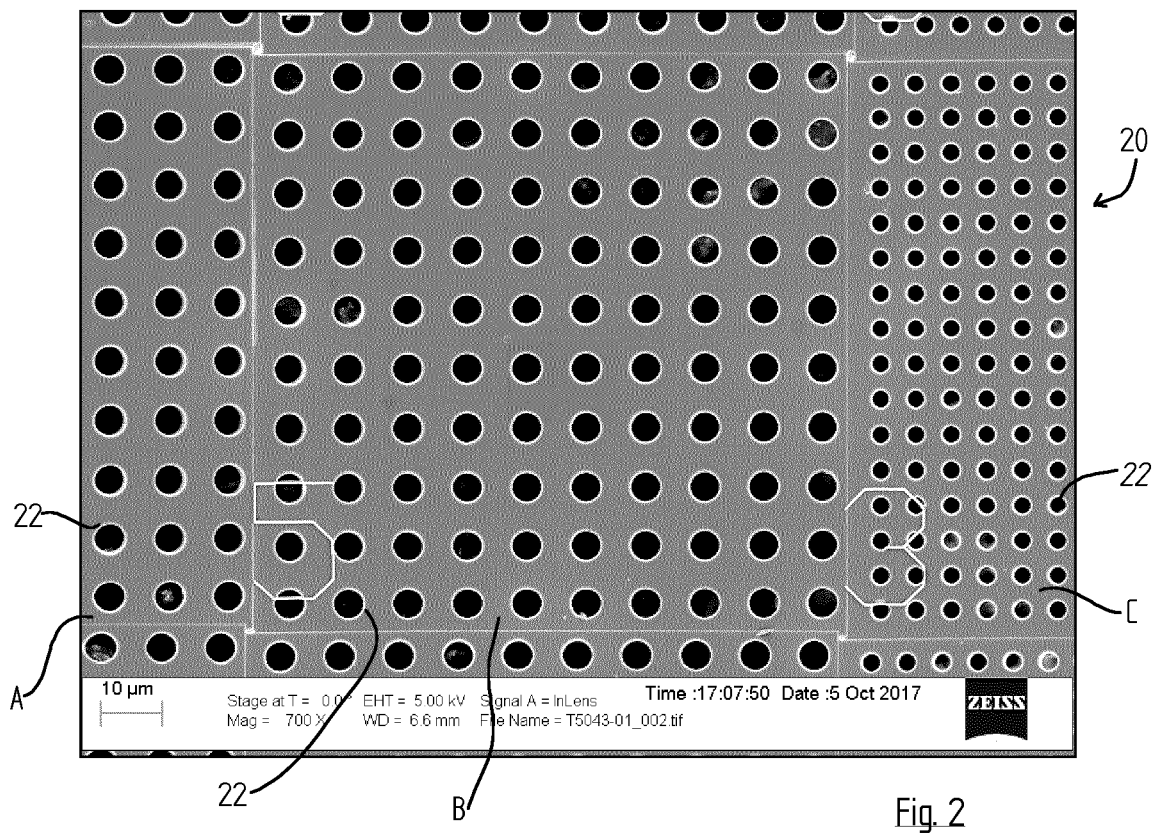
FIGS. 2 and 3 each show micrographs of further membranes.

Referring to FIG. 2 there is shown a micrograph of a membrane 20 formed form deliberately delineated printed regions A, B and C each having different sized printed test pores, and all shown less magnified than the membrane 10 shown in FIG. 1. The pore sizes are approximately, 4.5, 4 and 1.6, 2.5 µm respectively. The multiple pores shown are suitable for use as a membrane of the type described above. Using the protocol described below, these pores were manufactured by solidifying liquid polymer layer by layer, leaving a pore-size area unsolidified, and the unsolidified polymer was then washed out of the pore-size hole, to reveal the pore. Each region A, B and C etc, was printed in turn using optical manipulation, before moving on to the next region by mechanical movement of the partial membrane relative to the optical elements used to form each pore.

Figure 3:
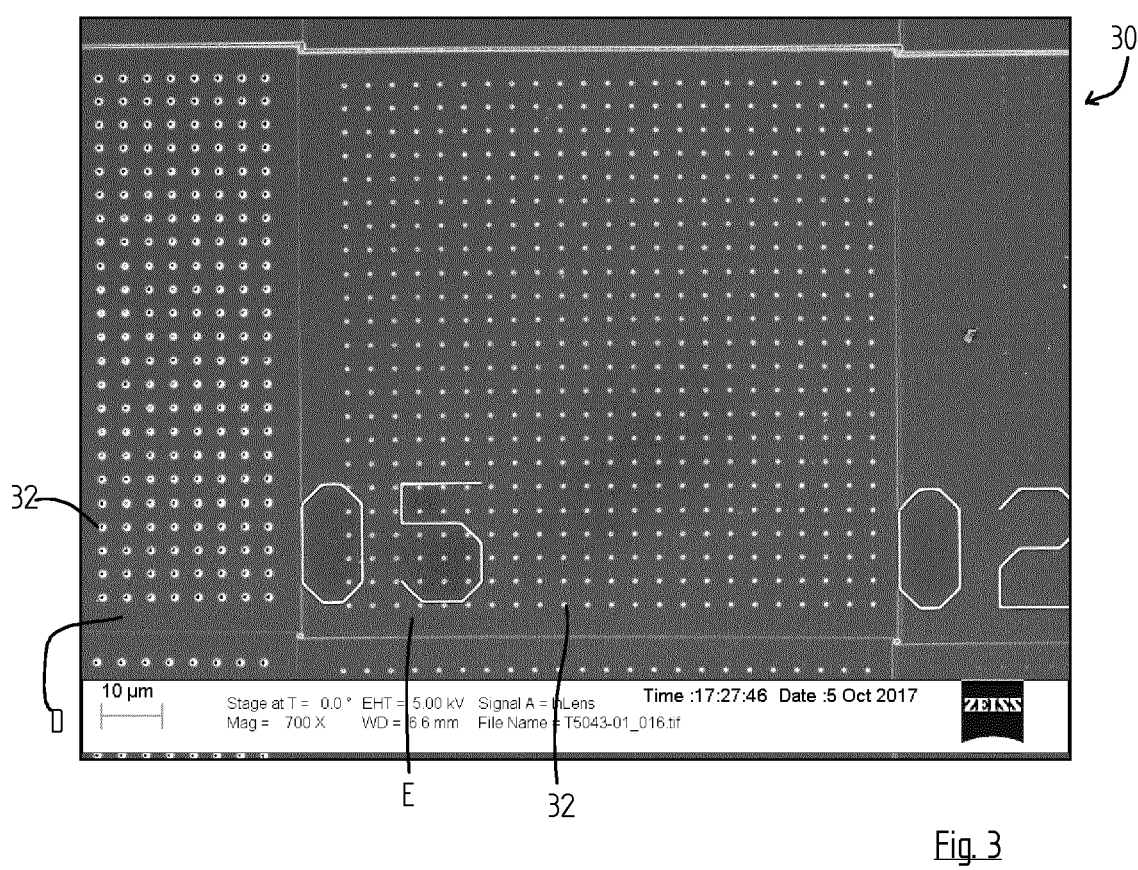

FIG. 3 shows a further membrane 30 having different regions D and E again having multiple pores 32 made in the same way as mentioned above, but much smaller in diameter, in this case pore of 2 and 1 µm respectively, have been formed. It will be apparent that the spacing between the pores 12, 22 and 32 shown could be increased or decreased to some extent, and the repeating grid pattern could be irregular or a different pattern, for example a tessellating pattern of regular shaped pores. In addition the shape of the pore could be other than circular, for example hexagonal pores could be used to reduce the amount of material that has be polymerised, where the hexagonal pores tessellate like a honey comb. In this way, membranes having the desired characteristics similar to conventionally manufacture membranes can be achieved. Pore density can be adjusted to suit the membrane's use, but up to 70% pore to solid material density is possible for example with regularly spaced pore rows space about 0.018D apart where D is the mean pore diameter and where the rows are staggered.

Figure 4A:
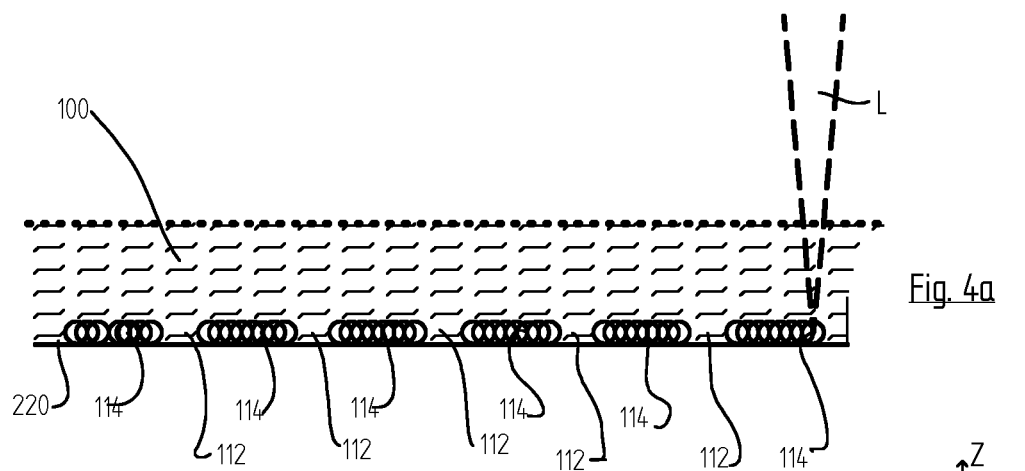
FIGS. 4a, 4b and 4c show a manufacturing technique for the membranes shown in FIG. 1,2 or 3.

Referring to FIG. 4a, there is shown schematically, an example of a production technique. Shown in section is: a portion of a bath of liquid composition 100, including a silicon rubber substrate floor 220. The composition includes a mixture of at least: photo-activatable monomer molecules, photo activation initiator molecules and photo-activation quencher molecules as described below. In this illustration a linear series 114 of bits of the polymerised composition 100, have been formed using a laser beam L, focused at the a constant bit height in the Z axis, having a femtosecond laser pulse triggered by a controller (250 FIG. 5) when the focal point is aligned in a desired X and Y axis coordinate, where Z is up and down the page of the illustration, X is left and right of the illustration, and Y is into and out of the illustration. Such a pulse forms overlapping polymerised bits 114 but control of the laser is used to leave unpolymerized 'pores' 112, and the laser is then optically repositioned at an adjacent position in order to repeat the solidification of the next series 114 of bits. In the illustration, the laser focal point P has been scanned in X (from left to right) and periodically energised, to produce the series 114 of bits, but was not energised at the positions where pores 112 are intended to be located.

Figure 4B:
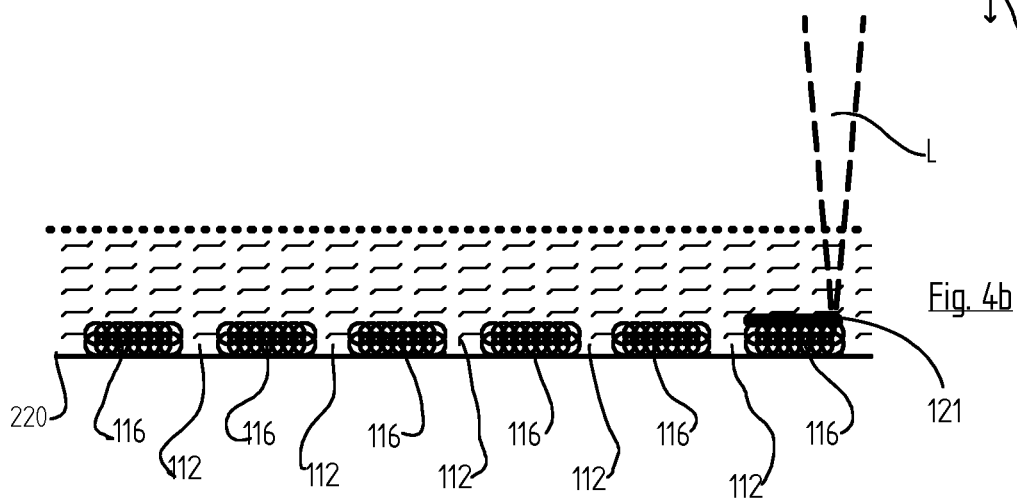

In FIG. 4b a second layer of polymerised bits has been produced, slightly overlapping the first layer shown in FIG. 4a, in this case by rescanning the focal point P in the same pattern as for FIG. 4a but raised in Z by a height of less than one bit size to overlap the first series of bits, but again allowing un-energised scanning of the laser over the pore areas 112. That layer by layer polymerisation can be repeated over and over to produce a membrane of a desired thickness, and with almost any pore size and pore pattern.

Figure 4C:
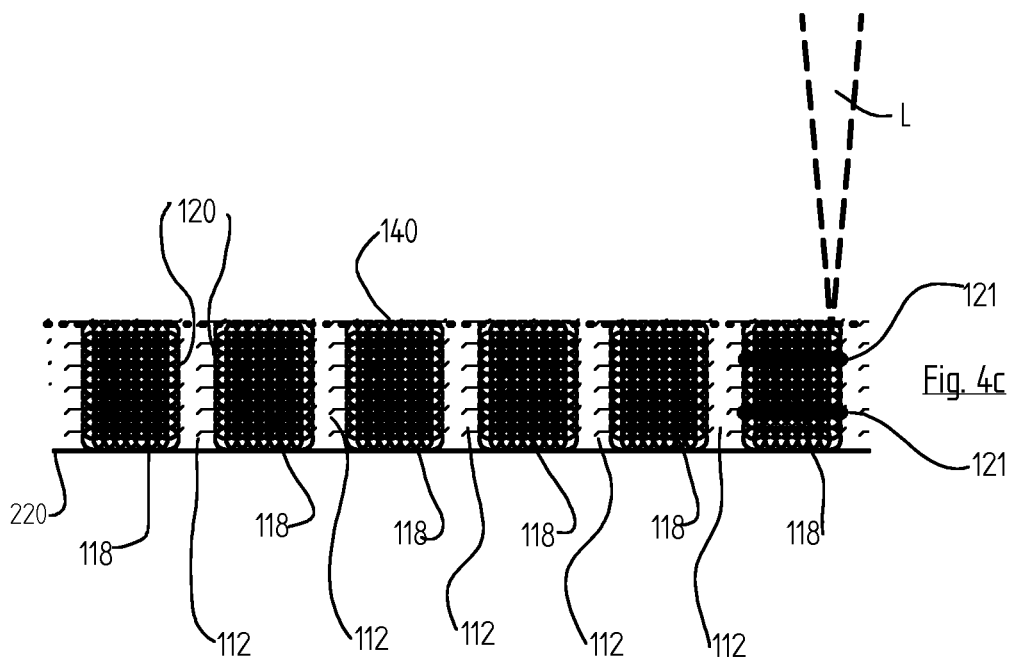

FIG. 4c shows a final membrane 140, formed by yet more layers of bits formed onto previous layers having unpolymerized pore areas 112. In practice those pore areas 112 are emptied of unpolymerized composition, by washing the membrane 140 with solvent. For clarity, the bits are shown far larger than they are when formed in practice. Interstitial areas 118 formed between the edges 120 of the pore areas 112 are shown polymerised. However, it is within the ambit of this invention to leave at least a portion of those interstitial areas 118 unpolymerized, and once the pore areas 112 are washed out, a wide area final polymerisation can take place which polymerises the area 118 also.

For convenience the pore areas 112 have been shown as a simple vertical pore path, but it is just as simple to produce other shaped pore paths, for example a spiralling pore, a zig-zag pore, a pseudo random path, or the like, which in practice may be a better shape to retain or capture analytes of interest for example large molecules such as proteins, or cells, whilst allowing other matter to pass through the membrane. Such a circuitous path provided for depth filtering as described above.

It should be understood that FIGS. 4a, b and c show schematically a membrane in cross section, with pores 112 shown oversize in relation to the solidified areas 118, for ease of understand.

The pore diameter may be less than 5 μm or larger, with typical pore path lengths (not necessarily membrane thickness) of 5, 10, 20, 50 or 100 times the pore diameter. If the pore edge 120 only is to be polymerised, leaving the area 118' still liquid, then for tall pores which have relatively small diameter, that then tall hollow structure will be weak once the liquid in the pore area 112 has been washed out. It is possible to strengthen those solidified edges 120 by polymerising a brace 121, joining, say, adjacent edges 120 of adjacent pore areas 112. Multiple braces between pores edges 120 could be employed for increased strength and rigidity, for example cross braces 121 shown in FIGS. 4b and c.

Figure 5:
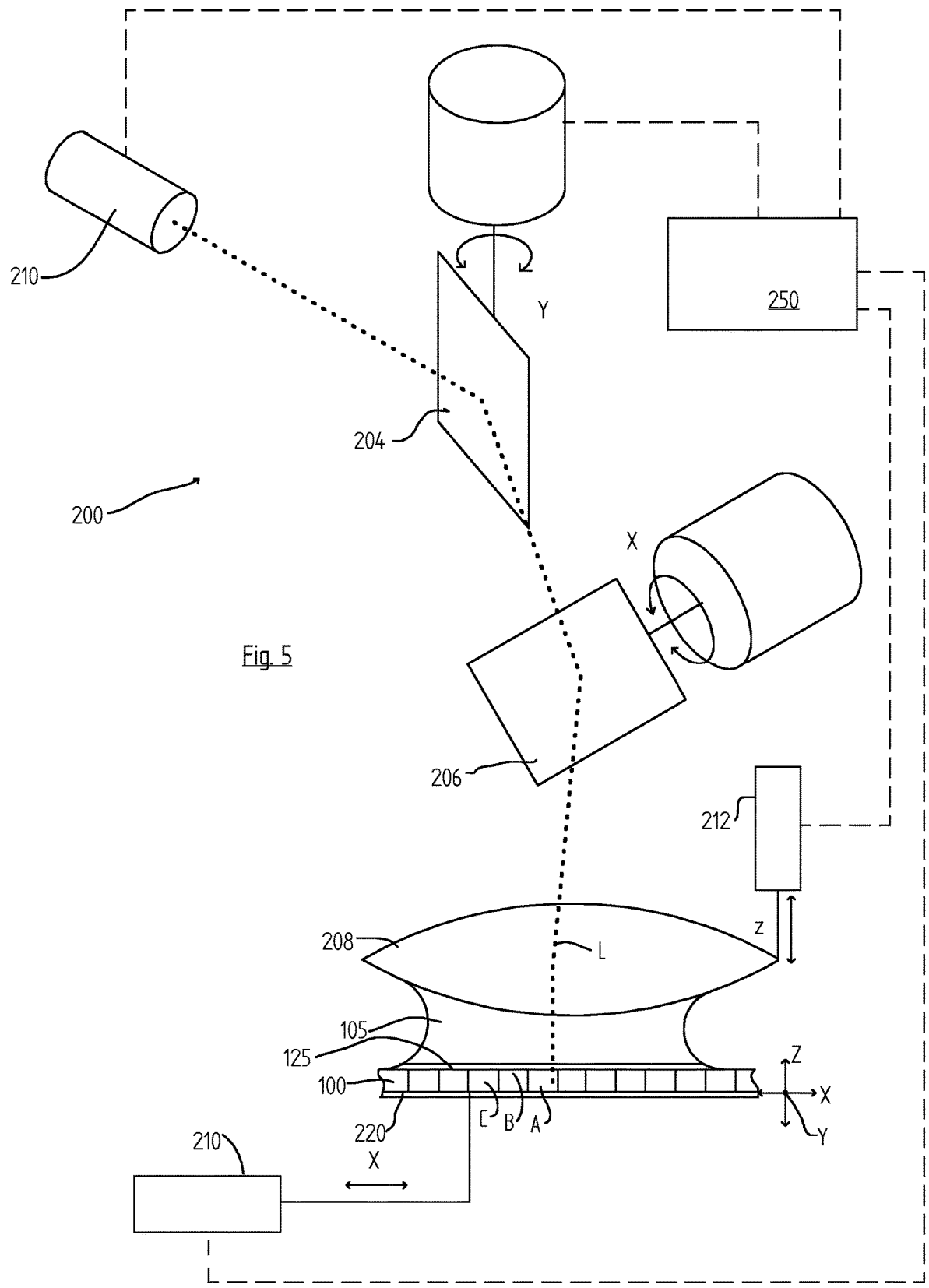
FIGS. 5 and 6 each show manufacturing equipment for the manufacture of the membranes illustrated.

FIG. 5 shows one example of equipment 200 used to manufacture the above mentioned membrane. In this example a laser 202 is oriented to propagate a beam of coherent light L toward two galvanic reflective mirrors 204 and 206 each under the influence of a controller 250. An adjustable objective lens or lenses 208, again under the influence of the controller 250 is used to focus the beam L to an exact polymerisation point P in the bath 100, for polymerisation as described above. Controlled movements of the mirrors 204 and 206, provide rapid repositioning of the focal point P, and with rapid firing of the laser with a femtosecond laser pulse, then the series of polymerised bits 114 mentioned above are achieved in the region A shown. Layers of bits can be made by adjustments in the Z height of the lens 208 using a linear actuator 212 under the control of the controller 250. The bath 100 is repositioned in the X axis using a further linear actuator 210, and in the Y axis by a similar arrangement not shown, in each case the actuators are under the influence of the controller 250 so that the next regions B and C etc can be polymerised in the same manner by the rapid mirror movements mentioned, before the next region is selected. For better accuracy, the space between the objective 208 and a glass layer 125 above the bath 100 is filled with light transmissive oil 105, so that the light path of the laser light pulse L is largely through materials with about the same refractive index.

Figure 6:
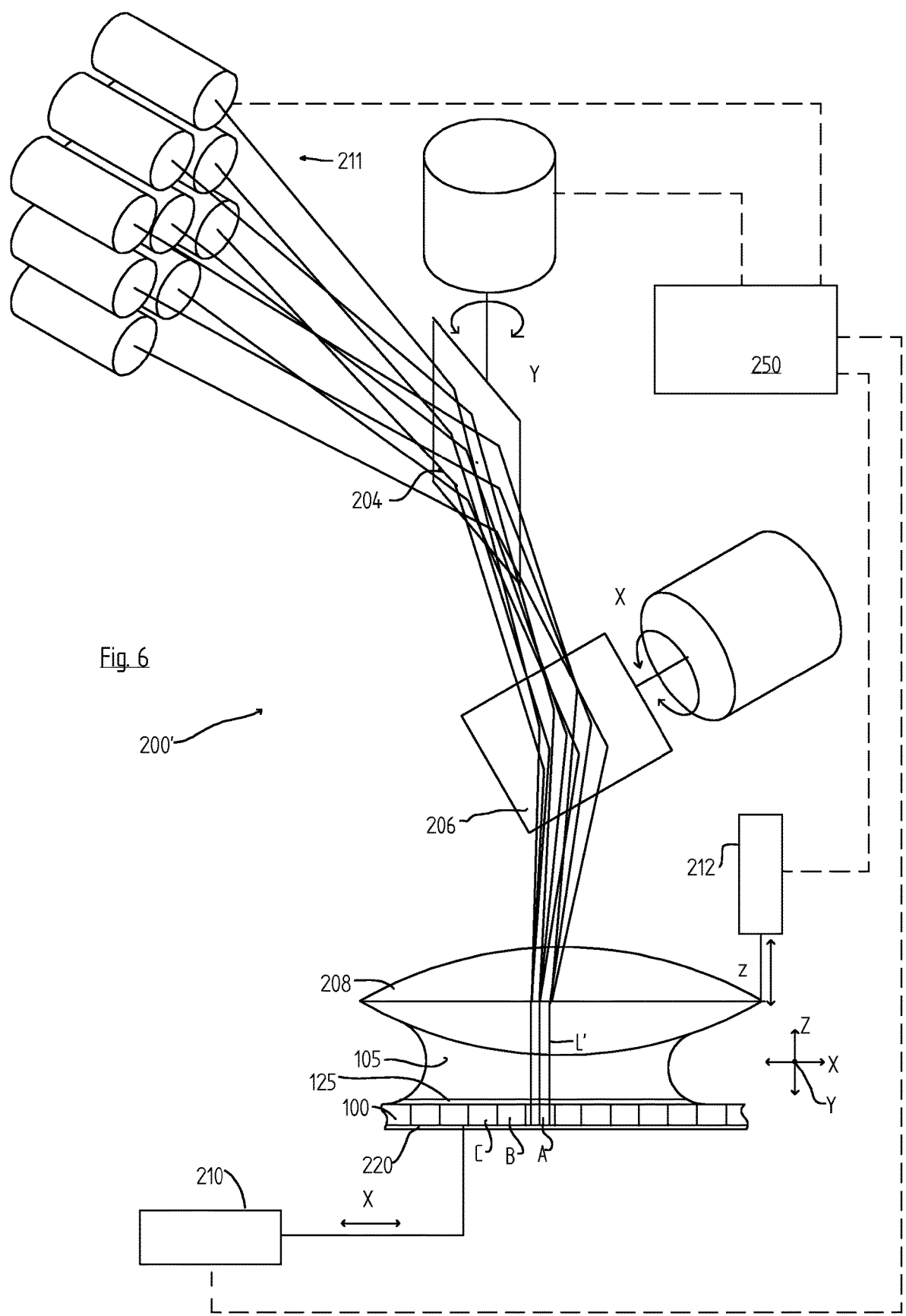

Whilst the above equipment will provide adequately fast production, faster production is desirable, and so the use of multiple laser beams L as shown in FIG. 6 is preferred, which in this case come from multiple lasers 211, of equipment 200' but could be produced by splitting a more powerful laser beam into numerous beams using plural beam splitters. The latter approach is less costly, but requires more optical alignment, and so multiple lasers are preferred. The equipment 200' shown in FIG. 6 operates in a similar manner to that described above with reference to FIG. 5, except that plural lasers 211 are grouped together with their output beams formed into a convergent pattern, in this case nine lasers are arranged in a three by three, two-dimensional pattern. The beams propagate toward the bath of polymer composition 100 as explained above and can be moved stepwise to form the polymerised bits as detailed above.

In order to mitigate heat build-up, the laser beam L (FIG. 5) or laser beams L' (FIG. 6) can be moved by more than the width between adjacent pores (i.e. the pore pitch), and/or the beams L' can be more than one pore pitch apart. Thus, for example if the beams L' are space by X pitches and moved by X−1 pitches stepwise then, excluding edge pores, the remaining pores can be formed with less heat build-up than by moving just one pitch at a time. Whilst FIG. 6 shows multiple lasers, it would be possible to replace those lasers with an array of LED lasers.

Irrespective of which method of polymerisation is used, the successive layering of polymerised material can lead to reduced transparency and diffraction issues. To mitigate those issues, the laser light system may take advantage of modelling the exact underlying 3D structure by evaluating and optimizing the dose, angle etc of the localized light and energy application to account for non-uniformity in the structure, diffraction patterns etc.

Figure 7:
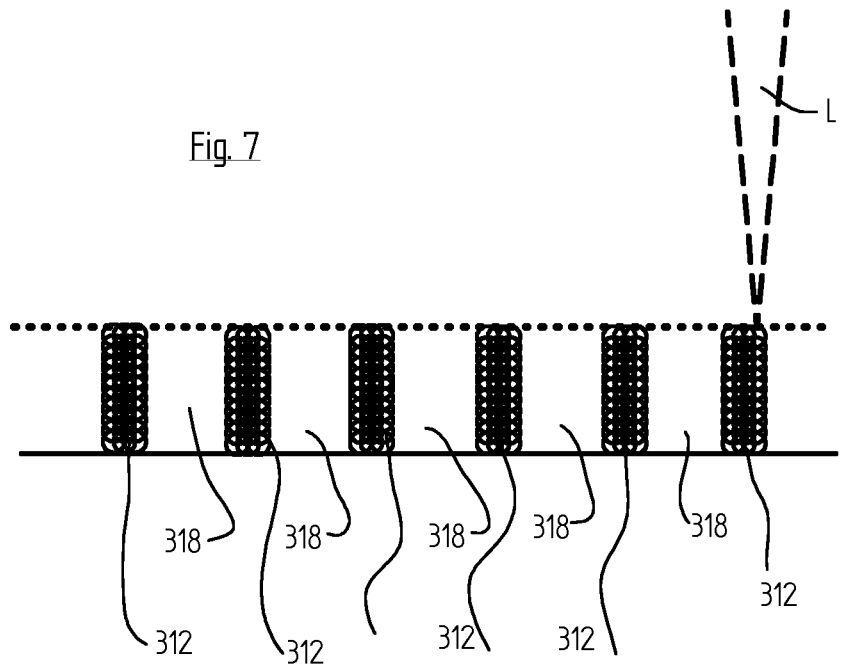
FIG. 7 shows a variant of the membrane manufacturing technique shown in FIGS. 4a to 4d.

Another membrane manufacturing technique is shown in FIG. 7, where a male mould having artefacts 312 is formed by photo polymerisation using the same techniques as described above. The unpolymerized remainder 318 of the polymer is washed away, to leave a male mould, where the now voids 318 can be filled with a membrane forming material such as an in-filling thermosetting polymer. Once the in-filling polymer is set the moulds can be removed mechanically or by washing away with a suitable solvent, or by means of heat, to leave pores equivalent to the pores 12, 22, 32 112 etc as described above.

An example of the composition 100 and manufacturing protocol follow:

The flowable composition 100 in one example comprises a transparent photo-activatable acrylate monomer resin, with the addition of up to 3% of a photo activation initiator, such as an acylphosphine oxide such as 2,4,6-trimethylbenzoyl-diphenylphosphine oxide molecules, or a benzophenone, a xanthone, or a quinone, or a combination of these molecules, and a photo-activation quencher such as tertiary amine molecules. The Laser can be an exciplex laser (also known as a excimer laser) having at output wavelength of about 800 nm with a pulse length of 10 to 100 femtoseconds (fs), although about 40 to 60 fs, for example 50 fs is preferred, and a repetition rate of about 5 MHz is possible.

Where it is the pores that are of principal dimensional interest, the interspace between the pores could be filed-in with lower resolution, for example by using higher energy laser light where possible to photopolymerize a larger area more quickly, and thereby speeding up the manufacturing process, or by the introduction of material by jetting, i.e. liquid thermoplastic introduction, which need not be the same material that surrounds the pore.

The energy required to induce local polymerisation is provide by a focused laser pulse at at least one focal point in the composition 100 by means of two-photon absorption polymerisations, i.e. two or more photons are simultaneously absorbed by the above photo activation initiator (photoinitiators) to create the active species that start polymerisation of the monomer resin. Under these conditions, multiphoton absorption occurs only in the region where light intensity is at a maximum. That confines polymerization within the volume of the focused laser beam (known as a voxel). Slightly overlapping, for example 25% overlapping bits of polymerised material are thus produced. The quenching molecules provide fluorescence quenching to inhibit or halt the dendritic spread of polymer branches, which in turn provides a more consolidated and defined polymerisation volume. The membrane is revealed by washing away the unsolidified part of the resin using an organic solvent.

Figure 8:
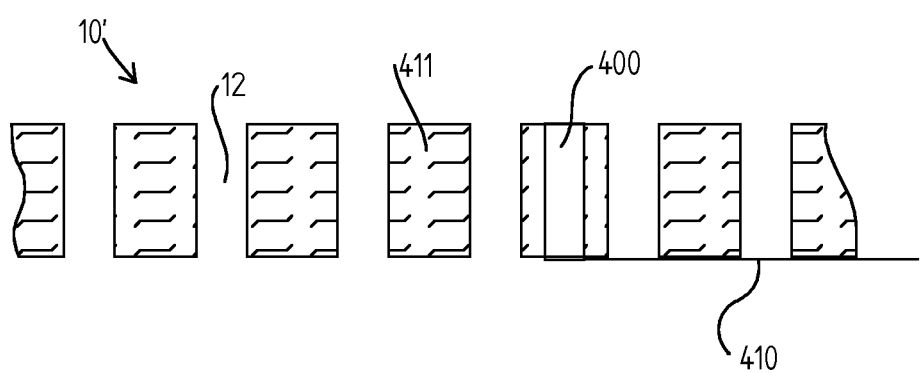
FIG. 8 shows a variant of a finished membrane.

The results of the above mentioned techniques and materials used, provide a suitable equivalent to conventional laminar nitrocellulose membranes and to Trak Etch membranes, including their thickness and pore density. However, it is envisaged that variants could be produced to enhance the properties of the membranes made according to the invention. For example, as shown in FIG. 8, a membrane 10' is shown having fibres 411, for example nano-fibres introduced into the composition bath 100 during manufacture, which do not unduly interfere with the formation of the pores described above. The finished membrane 10' has improved mechanical strength. Additionally, or alternatively, a mesh or web of material (not shown) having a weave which is relatively course compared with the size and positioning of the membrane pores could be immersed in the bath prior to polymerisation, to achieve the same effect. Once the pores have been formed, the mesh etc becomes incorporated into the membrane, again adding significant strength, and thereby allowing greater trans-membrane pressure differential.

The substrate support 220 mentioned, is intended in the examples above to be a removable surface on which to form the membrane. In addition, the substrate's 220 surface may be employed to mount one or more micro-sensors 400 (FIG. 8) thereon, and if needed, electrically conductive paths 410 for communication and/or power to/from such sensors, for example formed on the surface of the support 220 prior to the polymer bath being present, by 3D printing. Peeling off the support 220 from the finished membrane or vice versa, will leave the sensors and any conductive tracks in place ready to be used on or in the finished membrane. In this case the micro-sensor 400 is a capacitive gap sensor which measures transmembrane pressure differential, which can give an indication of the filtering performance of the membrane. Other sensors could be used, for example, other pressure sensors, flow sensors, conductivity sensors, pH sensors, osmolality sensors, chemical composition or concentration sensors etc, which can provide data in real time as filtration takes place, for example membrane performance. In another example (not illustrated) the membrane can be formed on a substrate, which substrate includes a light absorbance sensor and the membrane includes an inlet and outlet to the sensor, such that the photo-adsorbent properties of the fluid passing through the membrane can be monitored remotely. Thereby, the concentration of proteins or the like can be monitored. In yet another variant, the membrane can be formed over microfluidic valves and over a pressure sensor, which can produce a signal for opening the valves, for example if the side to side membrane pressure differential exceeds a predetermined amount. Other sensors could be used, for example an electrical conductivity sensor where an interruption in an electrical path, for example if a membrane were to rupture would signal membrane failure, or temperature sensing, could be used. The use of more conventional, lower resolution material additive manufacturing to produce the addition sensors or other ancillary parts of a membrane, e.g. a frame or other physical support, can be combined with the membrane manufacturing methods described herein with good results.

The embodiments shown, provide a flat membrane, but membranes can be useful in other shapes, for example tubular membranes which act as hollow fibres, in hollow fibre filtration. Thus, the term membrane used herein is intended to cover sheet like materials and other thin materials which are not necessarily flat.

Although numerous embodiments have been described and illustrated, it will be apparent to the skilled addressee that additions, omissions and modifications are possible to those embodiments without departing from the scope of the invention claimed.

The techniques described above can be used to achieve said asymmetric features in a single membrane layer, may even have multiple asymmetries in physical properties (for example wider, then narrower, then wider pores) and/or contoured surface characteristics to promote surface or depth filtering, such as a funnel pore opening or narrowed pore opening.

Chemical ligands or anchors for subsequent ligand attachment may be printed, allowing controlled placement and subsequent modifications of non-isotropic, asymmetric character for improved function and/or more efficiency use of (expensive) ligands.

The techniques described above require a relatively small optical head scanning distance for producing polymerised areas of a small dimension, then moving the optical head on to another region to be polymerised, or moving the material to be polymerised relative to the head. In that case it is desirable to match the pore pattern at each region, but it is not essential. It is also possible to have discontinuities in pores, folds or pleats at boundaries between regions. Then folded parts of the membrane can be adhered to relatively rigid parts to form filter cassettes or cartridges.

Above in relation to FIG. 8 is described the technique of printing over known sensors or other hardware, and thereby incorporating such hardware into the then printed membrane. In other embodiments it is possible to form the sensor, or part of the sensor from the polymerised material. For example for the pressure senor mention above, it is possible to form a flexible compressible cavity this wall formed from polymerised material, where a sensing surface is precisely formed as a flexible, pressure sensitive membrane and the rest of the cavity would act as a fluid conduit to a pressuring sensitive sensor device, thereby allowing measurement of fluid pressure at some internal part of the membrane.

Further, in an embodiment it is possible to light conduits or light guides. Such light guides may provide for a secondary polymerization step, for example inside a structure with poor transparency. Where the lights have terminal light diffusers or lenses, then light guided into the part-polymerised membrane into the structure can be used to fully polymerise the membrane.

Discrete sheet membrane production has been described and illustrated, but it will be apparent that other techniques could be employed, for example a continuous manufacturing technique could be used, for example the finished membrane could be peeled off its support 220, washed to produce the pores and then rolled onto a roll.

Single or multiple laser light polymerisation is envisaged above, although multiple light paths could be produced using a holographic system, or beam splitters and multiple lenses. The polymerised material can be chosen to be sterilisable, from example by gamma radiation. As well as, or alternatively, sterilisation could be achieved by producing the membrane under sterile closed conditions, and using pre-sterilised materials. Sterilised finished membranes would then be suitable for single use applications and, if biocompatible materials are employed, these can become part of a Good Manufacturing Process (GMP) process, suitable for medical applications, such as cell and gene therapies.

The invention claimed is:

1. A method for the production of a porous polymer membrane suitable for liquid filtration or analyte capture, comprising the following steps:
   providing a flowable composition on a substrate, the composition including photo-activatable monomer molecules, photo-activation initiator molecules and photo-activation quencher molecules;
   providing one or more pulses of laser light to at least one focal point in the composition of sufficient energy to locally polymerize the composition by reacting the photo-activatable monomer molecules with the photo-activation initiator molecules and the photo-activation quencher molecules;
   moving the or each focal point relative to the previously polymerized composition in a continuous or stepwise predetermined manner to a multiplicity of further positions; and
   repeating the pulse(s) at those further positions such that a three dimensional matrix of the composition is polymerized leaving unpolymerized areas of from 0.1 microns to 10 microns.

2. The method as claimed in claim 1, wherein the substrate is immersed in the composition, or is repeatedly replenished by an amount of the composition.

3. The method as claimed in claim 1, wherein the pulses of laser light are supplied by a laser via an objective lens for focusing the light to the focal point or points along a Z axis which axis is generally parallel to the direction of propagation of the laser light passing through the lens, and via further optical elements capable of moving the or each focal point laterally to said Z axis, wherein moving the or each focal point laterally to said Z axis comprises moving along an X axis perpendicular to said Z axis and/or moving along a Y axis perpendicular to the Z and X axes, wherein control of the laser and optical elements provides at least a portion of said multiplicity of positions at a first region.

4. The method as claimed in claim 3, wherein the substrate and any polymerized composition are repositioned at least in said X, Y axes relative to said lens, to expose a second region to said laser light pulses.

5. The method as claimed in claim 1 employing a laser pulse having a short length and providing about 2 photon absorption per pulse.

6. The method as claimed in claim 1, wherein the at least one focal point is a plurality of focal points, derived from a split laser beam and/or plural laser light sources.

7. The method as claimed in claim 6, wherein the focal points are in a linear array or a two dimensional array and spaced by the pitch of the desired pore spacing or a multiple of that pitch.

8. The method as claimed in claim 7, wherein the linear or two dimensional array of focal points is moveable together optically to maintain their spacing.

9. The method as claimed in claim 1, wherein the polymerization is performed only at locations intended to be pore walls, wherein all or a majority of the interspace between polymerized pore walls is left unpolymerized, and wherein the method then further includes removing the unpolymerized composition from the areas equivalent to the membrane pores, and then further wider area photopolymerizing the unpolymerized interspace by means of a polymerizing light applied over the whole or a substantial part of the membrane, or sequential regions thereof, and the method optionally including polymerizing the top and bottom of the membrane prior to said further wide area photopolymerizing.

10. The method as claimed in claim 9 wherein said interspace includes polymerized features acting to brace one pore wall with another including adjacent pore walls.

11. A method for the production of a porous polymer membrane suitable for liquid filtration or analyte capture, comprising the following steps:
    providing a flowable composition on a substrate, the composition including photo-activatable monomer molecules, photo-activation initiator molecules and photo-activation quencher molecules;
    providing one or more pulses of laser light to at least one focal point in the composition of sufficient energy to locally polymerize the monomer;
    moving the or each focal point relative to the composition in a continuous or stepwise predetermined manner to a multiplicity of positions and repeating the pulse(s) at those positions such that three dimensional pillars are formed of a size of from 0.1 microns to 10 microns,
    the method further comprising the steps of:
    removing unpolymerized composition, infilling the regions around said pillars with a membrane material, and then removing the pillars from the membrane material, to leave open pores in the membrane material.

12. An apparatus for producing a porous membrane, wherein the apparatus is configured to perform the method of claim 11.

13. The apparatus of claim 12, including a roll for accepting finished filter membrane.

* * * * *